(12) United States Patent
Weaver

(10) Patent No.: US 7,314,316 B2
(45) Date of Patent: Jan. 1, 2008

(54) SELF-ALIGNING OPTICAL CONNECTOR AND METHOD FOR USING THE SAME

(75) Inventor: Thomas L. Weaver, Webster Groves, MO (US)

(73) Assignee: The Boeing Company, Chicago, IL (US)

( * ) Notice: Subject to any disclaimer, the term of this patent is extended or adjusted under 35 U.S.C. 154(b) by 141 days.

(21) Appl. No.: 11/359,112

(22) Filed: Feb. 22, 2006

(65) Prior Publication Data

US 2007/0196052 A1 Aug. 23, 2007

(51) Int. Cl.
G02B 6/38 (2006.01)

(52) U.S. Cl. .............. 385/58; 385/76; 385/55

(58) Field of Classification Search ............. None
See application file for complete search history.

(56) References Cited

U.S. PATENT DOCUMENTS

| | | | | |
|---|---|---|---|---|
| 4,015,894 A | * | 4/1977 | Rocton | 385/63 |
| 4,339,658 A | | 7/1982 | Fromm et al. | |
| 4,605,281 A | * | 8/1986 | Hellewell | 385/70 |
| 5,524,153 A | * | 6/1996 | Laor | 385/16 |
| 6,741,770 B2 | * | 5/2004 | Dean et al. | 385/22 |

OTHER PUBLICATIONS

Baibarac et al, "Nanocomposites Based on Conducting Polymers and Carbon Nanotubes from Fancy Materials to Functional Applications," Journal of Nanoscience and Nanotechnology, vol. 6, No. 1, 2006, pp. 1-14.
"Combined Search and Examination Report Under Sessions 17 and 18(3)" mailed on Jun. 13, 2007 by UK Intellectual Property Office, 5 pgs.
Lu, Shaoxin et al, "Optically driven nanotube actuators," Nanotechnology, 2005, vol. 16, pp. 2548-2554.

* cited by examiner

Primary Examiner—Sung Pak
(74) Attorney, Agent, or Firm—Lee & Hayes, PLLC

(57) ABSTRACT

A self-aligning connector for connecting fiber-optic cables including a first component connected to a first cable of the cables during use of the connector and a second component connected to the first component and a second cable of the cables during use of the connector. The connector further includes an optomechanical element positioned adjacent and between the first component and the second component during use of the connector. The optomechanical element includes a photosensitive material that changes a dimension when exposed to light during use of the connector and a portion of the optomechanical element protrudes into a light path passing through the connector when the first component and the second component are misaligned. The optomechanical element changes the dimension and moves the second component with respect to the first component to align the connector when the protruding portion is exposed to the light during use of the connector.

20 Claims, 5 Drawing Sheets

SELF-ALIGNING OPTICAL CONNECTOR AND METHOD FOR USING THE SAME

BACKGROUND OF THE INVENTION

The present invention relates to optical connectors and, more particularly, to self-aligning optical connectors.

Fiber-optic data networks include cables through which data signals are transmitted. The cables usually include glass and transmit light signals. Adjacent fiber-optic cables in these networks are joined by connectors and must be accurately aligned to ensure the data signals properly propagate from cable to cable. Thus, the connectors must hold the cables from becoming misaligned. Keeping adjacent cables aligned is especially difficult under severe conditions. For example, aerospace applications may expose networks to vibration, contamination, and extreme temperatures. Such conditions often result in cable misalignment when conventional connectors are used. Detachment and reconnection of conventional connectors, such as during cable replacement or connector maintenance, can also lower the ability of the connectors to hold adjacent cables within desired tolerance levels.

Some fiber-optic networks require very tight tolerance connectors to ensure data signals are properly transmitted through the connectors. For example, single-mode fiber-optic networks generally require tighter tolerance connections than multimode fiber-optic networks. Fiber-optic cables generally include a cladding surrounding a central core through which data signals are transmitted. In single-mode fiber-optic networks, a single high-strength signal is transmitted generally down the center of the core. In multimode fiber-optic networks, multiple signals are simultaneously transmitted through the core.

Although some or most of the signals transmitted through the cable in a multimode network may travel along a center of the core, at least some of the signals will propagate along paths other than directly down the center. Claddings are generally made of a material having a lower index of refraction than that of the core so that signals propagating toward the cladding are refracted or bent away from the cladding. Off-center signals are refracted back and forth as they move along the cable. Multimode networks can operate with looser connection tolerances because many or most of the multiple signals being transmitted through the cables can usually pass through the connector even if some are stopped. Multimode networks produce relatively low quality output data for at least two reasons. A first reason is that because the signals move through the cable along various paths, the signals will invariably arrive at the destination at various times. Thus, the terminating sensor or device must arrange the time-spaced signals together to form the resulting data. A second reason for low quality output in multimode systems is that many of the signals may get impeded at very loose joints between adjacent cables. Therefore, even with multi-mode fiber-optic networks, quality connectors are needed to ensure proper joint alignment.

Data is generally transmitted more accurately through single-mode fiber-optic networks because terminal devices only receive one signal and, thus, do not need to piece together multiple dispersed signals to form the data. However, because only a single signal stream is transmitted, it is imperative that the signals are not impeded as they travel through the network. Accordingly, the cables must be joined together within a very tight tolerance to ensure the signals pass through the joint. Conventional connectors exist that can maintain a relatively tight tolerance connection, but only under gentle conditions. Conventional connectors also exist that can withstand severe conditions, but can only maintain a loose connection. Connectors are needed that can keep fiber-optic cables aligned within very tight tolerances under severe conditions.

BRIEF SUMMARY OF THE INVENTION

The present invention relates to a self-aligning connector for connecting fiber-optic cables including a first component connected to a first cable of the cables during use of the connector and a second component connected to the first component and a second cable of the cables during use of the connector. The connector further includes an optomechanical element positioned adjacent and between the first component and the second component during use of the connector. The optomechanical element includes a photosensitive material that changes a dimension when exposed to light during use of the connector and a portion of the optomechanical element protrudes into a light path passing through the connector when the first component and the second component are misaligned. The optomechanical element changes the dimension and moves the second component with respect to the first component to align the connector when the protruding portion is exposed to the light during use of the connector.

In another aspect, the present invention relates to a fiber-optic system including a first cable through which light is transmitted and a connector attached to the first cable for receiving and transmitting the light. The connector includes an optomechanical element made of a photosensitive material that changes a dimension when exposed to light. The fiber-optic system further includes a second cable attached to the connector opposite the first cable for receiving and transmitting the light. A portion of the optomechanical element protrudes into a path of the light when the connector is misaligned during operation of the system and the optomechanical element changes the dimension to align the connector when the protruding portion of the element is exposed to the light during operation of the system.

In yet another aspect, the present invention relates to a method for connecting fiber-optic cables using a self-aligning connector. The method includes providing a first component of the connector, providing a second component of the connector for attachment to the first component, and providing an optomechanical element including a photosensitive material that changes a dimension when exposed to light. The method further includes positioning the optomechanical element adjacent the first component of the connector and positioning the optomechanical element adjacent the second component of the connector.

In still another aspect, the present invention relates to a method for aligning cables in a fiber-optic system including providing a first cable of the cables and providing a second cable of the cables for attachment to the first cable. The method further includes providing a connector including a first component connected to the first cable, an optomechanical element including a photosensitive material connected to the first component, and a second component connected to the first component, the optomechanical element, and the second cable. The method also includes transmitting light through the first cable to the connector along a light path. A portion of the optomechanical element protrudes into the path of light and the element changes a dimension and moves the second component with respect to the first component to align the connector when the connector is misaligned and the protruding portion of the optomechanical element is exposed to the light.

Other aspects of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE INVENTION

Figure 1:
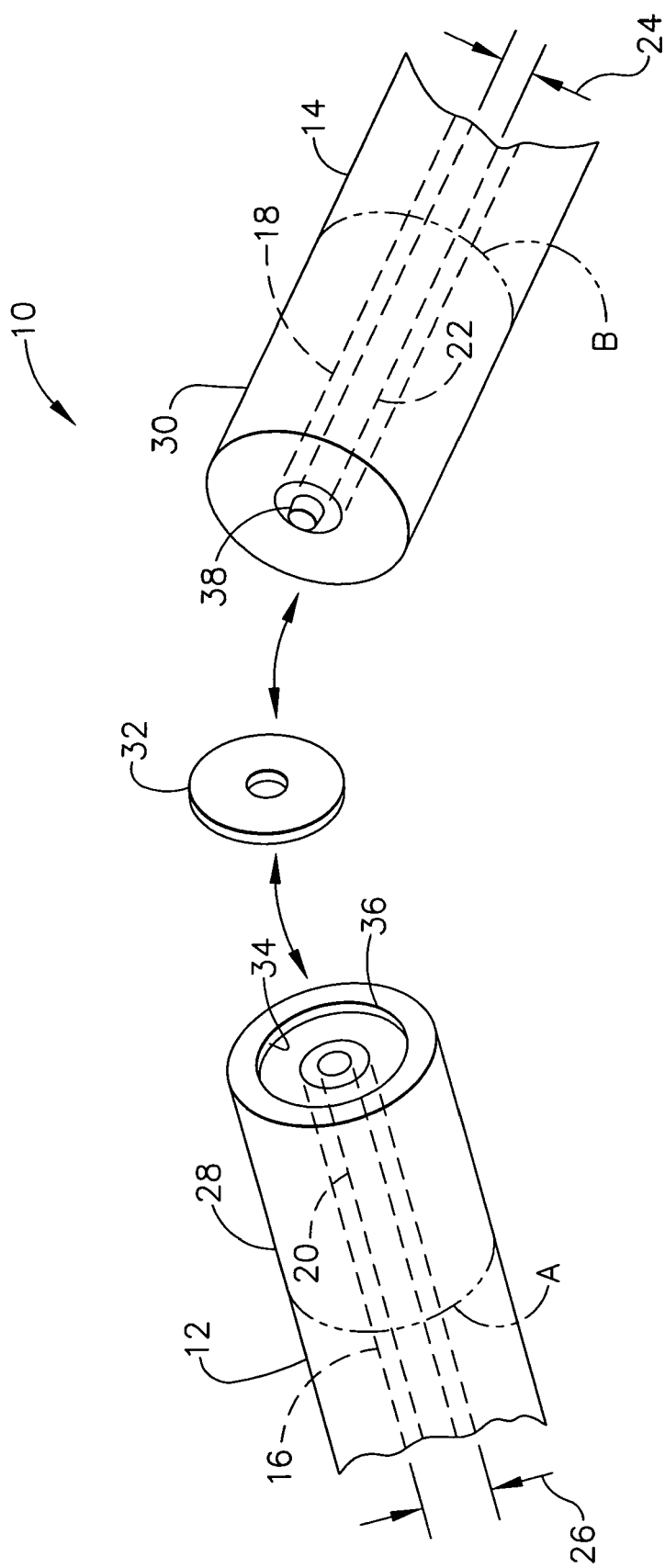
FIG. 1 is a perspective of a self-aligning connector according to the present invention.

Referring to the figures, and more particularly to FIG. 1, a self-aligning optical connector according to the present invention is designated in its entirety by reference number 10. The connector 10 joins two adjacent cables 12, 14. Each cable 12, 14 has a cladding 16, 18 surrounding a core 20, 22 through which light signals (not shown) are transmitted. The claddings 16, 18 and cores 20, 22 may be made of various materials without departing from the scope of the present invention. In one embodiment, each cladding 16, 18 is made of a material having a lower index of refraction than an index of refraction of a material the corresponding core 20, 22 is made of. As will be appreciated by those skilled in the art, a higher index of refraction core 20, 22 keeps the light signals within the core because signals propagating to the cladding 16, 18 at less than a critical angle with respect to an interface between the cladding and the core will be refracted or bent back toward the core. Although the claddings 16, 18 and cores 20, 22 may have other indexes of refraction without departing from the scope of the present invention, in one embodiment the cores have an index of refraction of between about 1.46 and about 1.48 and the claddings have an index of refraction of between about 1.44 and about 1.46. The claddings 16, 18 and cores 20, 22 may include glass. In one embodiment, each core 20, 22 includes doped glass, such as glass doped with germanium. Although the cores 20, 22 may have other diameters, in one embodiment each core has a diameter 24 of between about 3 micrometers and about 10 micrometers. Although the claddings 20, 22 may have other outer diameters 26, in one embodiment each cladding has an outer diameter of between about 15 micrometers and about 80 micrometers.

The connector 10 includes a first component 28, a second component 30, and an optomechanical element 32 positioned adjacent and between the components when the connector is assembled. The optomechanical element 32 includes a photosensitive material that changes at least one dimension when exposed to light. Further, in some embodiments, the material changes shape when exposed to light. The first component 28 is connected to a first cable 12 of the two fiber-optic cables and the second component 30 is connected to a second cable 14 of the two cables. The components 28, 30 are joined to connect the cables 12, 14 during use of the connector 10. The first and second components 28, 30 may be formed integrally with or separately from their corresponding cables 12, 14. That is, the first component 28 may be formed as an integral end of the first cable 12 or formed separately from the first cable and then attached thereto. For example, when formed separately, the first component 28 can be attached to the first cable 12 at a first attachment interface, designated by dashed line "A". Likewise, the second component 30 may be formed as an integral end of the second cable 14 or formed separately from the second cable and then connected thereto. For example, when formed separately, the second component 30 can be attached to the second cable 14 at an second attachment interface, designated by dashed line "B". In one embodiment, one of the first and second components 28, 30 is formed as an integral part of its corresponding cable 12, 14 and the other component 30, 28 is formed separately from and later connected to the other cable 14, 12. Components 28, 30 formed separately from the corresponding cable 12, 14 may be attached to the cables in various ways without departing from the scope of the present invention. For example, it is contemplated that separately formed components 28, 30 may be bonded (not shown) to the cable 12, 14. It is also contemplated that separately formed components 28, 30 have shapes that compliment shapes of the cables 12, 14 so the connector and the cable can be secured together using the complimentary shapes. For example, the components 28, 30 and cables 12, 14 can have complimentary threads for screwing one into the other for attachment.

The first component 28 includes a recess 34 having an edge 36 and the second component 30 includes a projection 38. The recess 34 and the projection 38 may be formed in various ways. For example, the recess 34 and the projection 38 may be formed by chemical etching or mechanical abrasion. In one embodiment, at least some of a surface of each component 28, 30 is polished to ensure a smooth fit between the first component, the second component, and the optomechanical element 32 and allow signals to propagate better through the connector 10.

Figure 2:
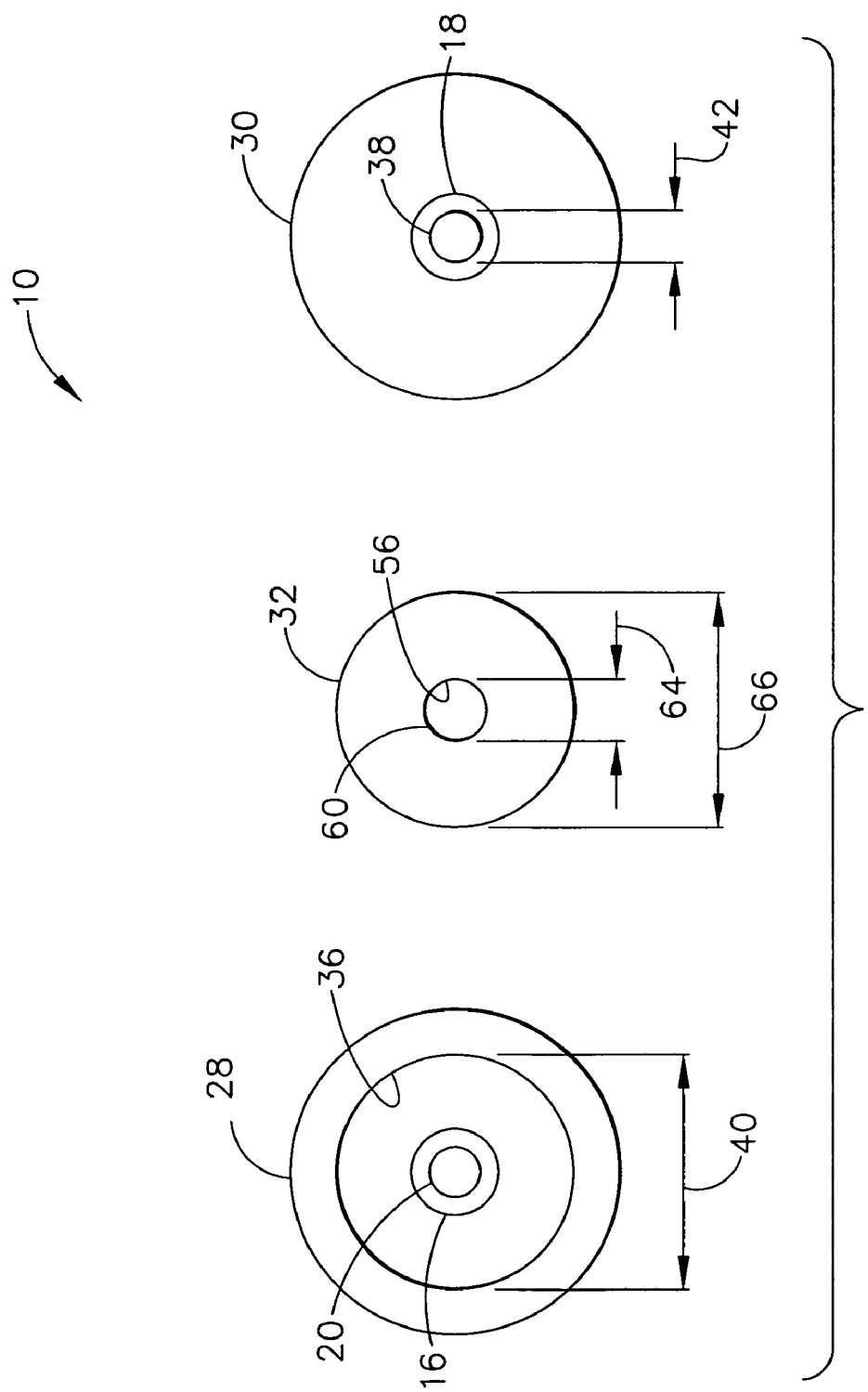
FIG. 2 is a plan view of a first component, an electromechanical element, and a second component of the connector.
Figure 3:
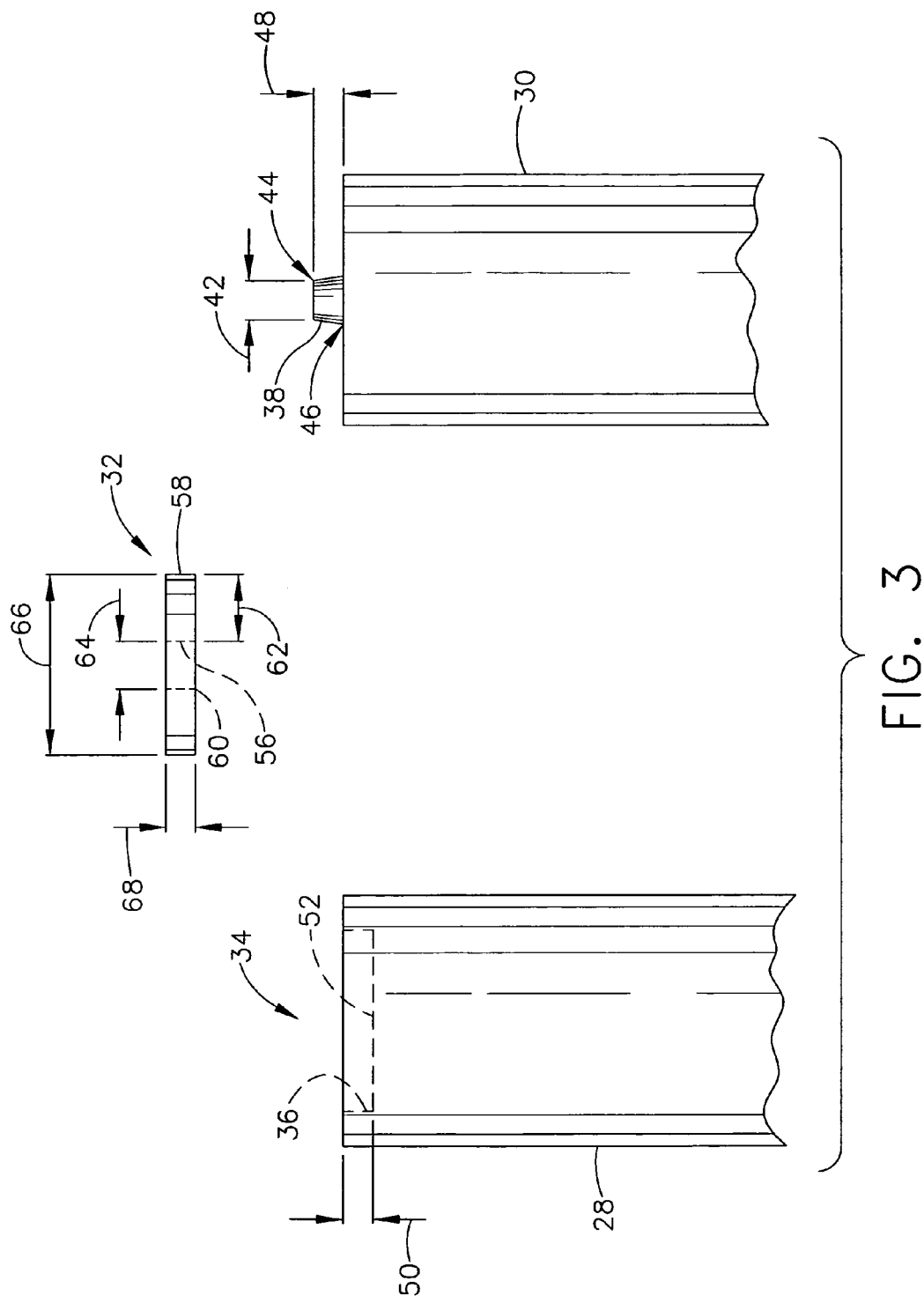
FIG. 3 is a side view of the first component, the electromechanical element, and the second component of the connector.

The recess 34 and the projection 38 may have various shapes and dimensions without departing from the scope of the present invention. In one embodiment, the recess 34 and the projection 38 are generally circular or round. Although the recess 34 may have other diameters 40 (shown in FIG. 2) without departing from the scope of the present invention, in one embodiment the recess has a diameter of between about 30 micrometers and about 80 micrometers. Although the projection 38 may have other diameters 42 without departing from the scope of the present invention, in one embodiment the projection has a diameter that tapers between a minimum of between about 3 micrometers and about 7 micrometers adjacent a top 44 (shown in FIG. 3) of the projection and maximum of between about 6 micrometers and about 10 micrometers adjacent a bottom 46 of the projection. In one embodiment, the projection has a height 48 that is slightly greater than a depth 50 of the recess to ensure that the projection 38 contacts a bottom 52 of the recess 36 when the connector 10 is assembled. For example, in one embodiment, the projection 38 is about 0.1 micrometer taller than the depth 50 of the recess 34. Although the projection 38 may have other heights 48 without departing from the scope of the present invention, in one embodiment the projection 38 has a height of between about 0.3 micrometers and about 0.7 micrometers. For example, in a particular embodiment, the projection 38 has a height of about 0.5 micrometers. Although the recess 34 may have other depths 50 without departing from the scope of the present invention, in one embodiment the recess has a depth of between about 0.2 micrometers and about 0.6 micrometers. In a particular embodiment, the recess 34 has a depth 50 of about 0.4 micrometers.

Figure 4:
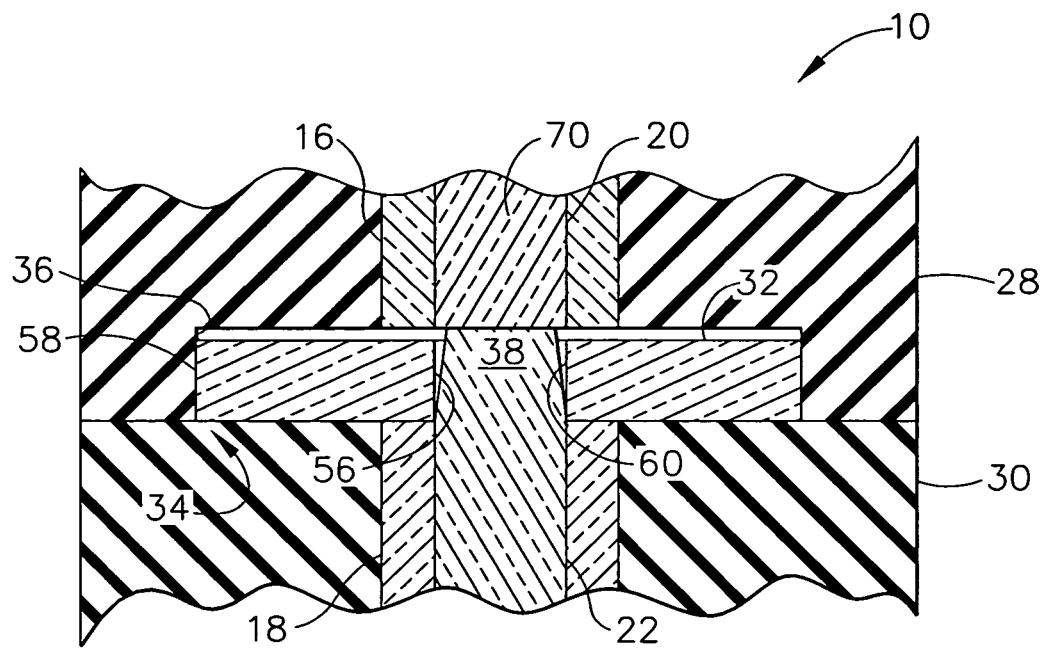
FIG. 4 is a side cross section of the connector.

The optomechanical element 32 has a cavity 56 and a periphery 58 and the cavity has an outer rim 60. The optomechanical element 32 has a radial thickness 62 extending between the cavity 56 and the periphery 58. As shown in FIG. 4, the cavity 56 of the element 32 is positioned around the projection 38 of the second component 30 and the periphery 58 of the element is positioned adjacent the edge 36 of the first component 28 when the connector 10 is assembled. The cavity 56 and the periphery 58 of the optomechanical element 32 have dimensions and shapes corresponding to the shapes of the projection 38 and recess 34, respectively. Thus, in one embodiment, the cavity 56 and periphery 58 are generally circular. Although the optomechanical element 32 may have other dimensions without departing from the scope of the present invention, in one embodiment the element cavity 56 has a diameter 64 (shown in FIG. 3) of between about 3 micrometers and about 10 micrometers, the element periphery 58 has a diameter 66 of between about 30 micrometers and about 80 micrometers, and the element has a longitudinal thickness 68 of between about 0.2 micrometer and about 0.4 micrometers.

Although the optomechanical element 32 may be made of other materials, in one embodiment the element includes nanotubes embedded in an elastomeric material matrix (not shown in detail). Nanotubes are two-dimensional crystalline sheets of atoms that have been rolled up and connected at a seam to form a closed cylinder. For example, carbon nanotubes are hexagonally shaped arrangements of carbon atoms that have been rolled into tubes. The element 32 may include more than one type of nanotube. Some types of nanotubes have been found to change dimensions and/or shape in response to stimulus, such as light. For example, carbon nanotubes have been found to decrease in size when exposed to light. As will be appreciated by those skilled in the art, when many sensitive nanotubes are embedded in a compliant matrix, the entire matrix will change a dimension and/or shape as the individual nanotubes change dimension and/or shape. A particular type of reaction the optomechanical element 32 has to a stimulus depends on a type or types of nanotubes used, a number of nanotubes used, a ratio of the nanotubes to the amount of matrix material used, a distribution of the nanotubes in the material matrix, and a type of material matrix used. In one embodiment, the element 32 includes millions of photosensitive carbon nanotubes embedded in a soft plastic. As will be apparent to those skilled in that art, particular materials for the matrix can be determined through experimentation.

Separation techniques can be used to select nanotubes having particular qualities. For example, a sample of a variety of nanotubes can be separated depending on any of various characteristics, such as size, shape, and/or dimensions, to select a sub sample of nanotubes to be used. The sub-sample may have performance characteristics that vary from the general sample. For example, a sub sample can be created that is sensitive to light of a predetermined wavelength and/or generally insensitive to light of another wavelength. In one embodiment, the optomechanical element 32 changes a dimension and/or shape when exposed to light having a wavelength between about 650 nm and about 690 nm and/or remains substantially the same when the element is exposed to light having a wavelength of between about 1,500 nm and about 1,600 nm.

Assembling the connector 10 for use includes positioning the optomechanical element 32 between the first component 28 and the second component 30. Steps for assembling the connector can be performed in various orders. For embodiments where the connector components 28, 30 are formed separately from the cables 12, 14, the connector 10 may be assembled before or after the components are connected to the cables. For example, the components 28, 30 and optomechanical element 32 can be assembled and then attached to the cables 12, 14. Alternatively, the components 28, 30 can be attached to the cables 12, 14 before assembling the connector 10. Further, the connector 10 can be partially assembled and then attached to the cables 12, 14. For embodiments where the connector components 28, 32 are integral parts of the respective cables 12, 14, the components only need to be attached together with the optomechanical element 32 between them. In these embodiments, the optomechanical element 32 may be attached to the first component 28 and then to the second component 30 or attached to the second component first and then to the first component.

Positioning the optomechanical element 32 adjacent the first component 28 includes positioning the element in the recess 34 of the first component. The element 32 is positioned in the recess 34 so the periphery 58 of the element is disposed adjacent the edge 36 of the recess. Positioning the element 32 adjacent the second component 32 includes positioning the cavity 56 of the element around the projection 38 of the second component. Because connector 10 operation depends on interaction between the element 32 and the components 28, 30, it is important to ensure contact between them. Specifically, the rim 60 of the cavity should firmly contact the projection 38 and the periphery 58 should firmly contact the edge 36 of the recess 34. In one embodiment, the periphery 58 of the optomechanical element 32 continuously contacts the edge 36 of the second component 30 around the entire recess 34 and the rim 60 of the optomechanical element contacts the projection 38 continuously around the projection. The tapered design of the projection 38 of the second component 30 ensures a tight connection between the element 32 and the second component. Specifically, the element 32 and the projection 38 are sized and shaped so the element becomes increasingly snug against the projection as the element is slid down around the projection.

One manner to ensure a snug fit between the optomechanical element 32 and the components 28, 30 is to temporarily contract or shrink the element during positioning. The element 32 may be shrunk, positioned as desired adjacent the components 28, 30, and then allowed,to expand in position. The optomechanical element 32 temporarily shrinks when it is exposed to light to which it is sensitive. The light used for shrinking the optomechanical element 32 for positioning can be produced by, for example, a portable light source (not shown) that can easily be moved around a manufacturing area and outdoors for use. The element 32 may be shrunk before or after it is positioned around the projection 38. After the preshrinking light is removed from the optomechanical element 32, the element will return to its default dimensions. The amount of time it takes for the element 32 to return to its default dimensions depends on the type of photosensitive material used and the type of light applied. An assembler of the connector 10 must position the element 32 in the recess 34 before the element has returned to its default dimension. In one embodiment, the assembler will have between about 20 seconds and about 90 seconds after the element 32 is removed from the shrinking light to position the element 32 in the recess 34 before the element expands too much to fit in the recess. After the element 32 is preshrunk by the light, positioned in the recess 34, and removed from the light, the element 32 will naturally expand to tightly fit against the edge 36 of the recess. The tightly fitting optomechanical element 32 is said to be pre-loaded in the connector 10 because the element will be applying a load against the components 28, 30 when the connector is in its default state.

Whether the first and/or second components 28, 30 are integral to or formed separately from the corresponding cables 12, 14, the cables are connected together using a fastening system (not shown). The fastening system may include fasteners conventionally used to connect fiber-optic cables. As will be appreciated by those skilled in the art, a ferrule-type fastener including springs that allows the first and second components 28, 30 to touch can be used to secure the cables 12, 14 together.

Figure 5A:
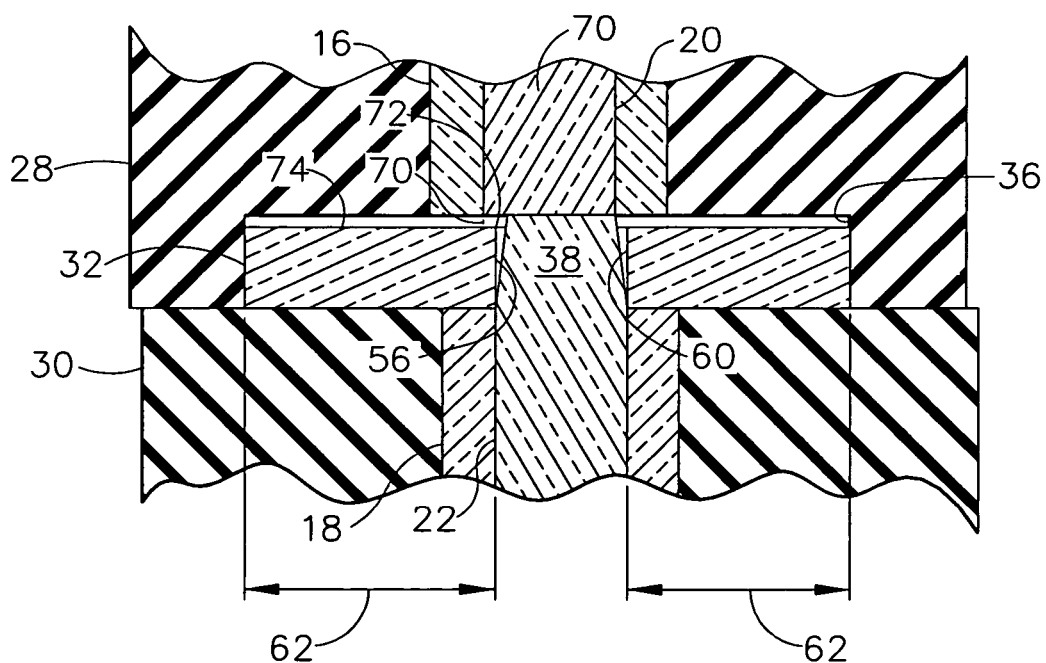
FIG. 5A is a side cross section of the connector when it is misaligned.
Figure 5B:
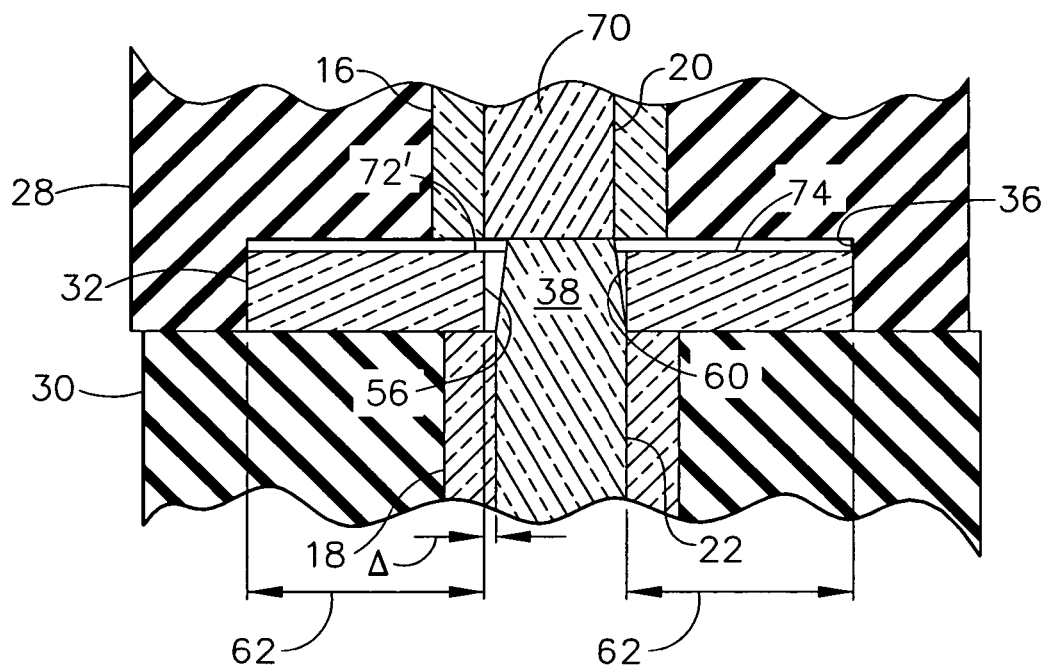
FIG. 5B is a side cross section of the connector while it is aligning itself.
Figure 5C:
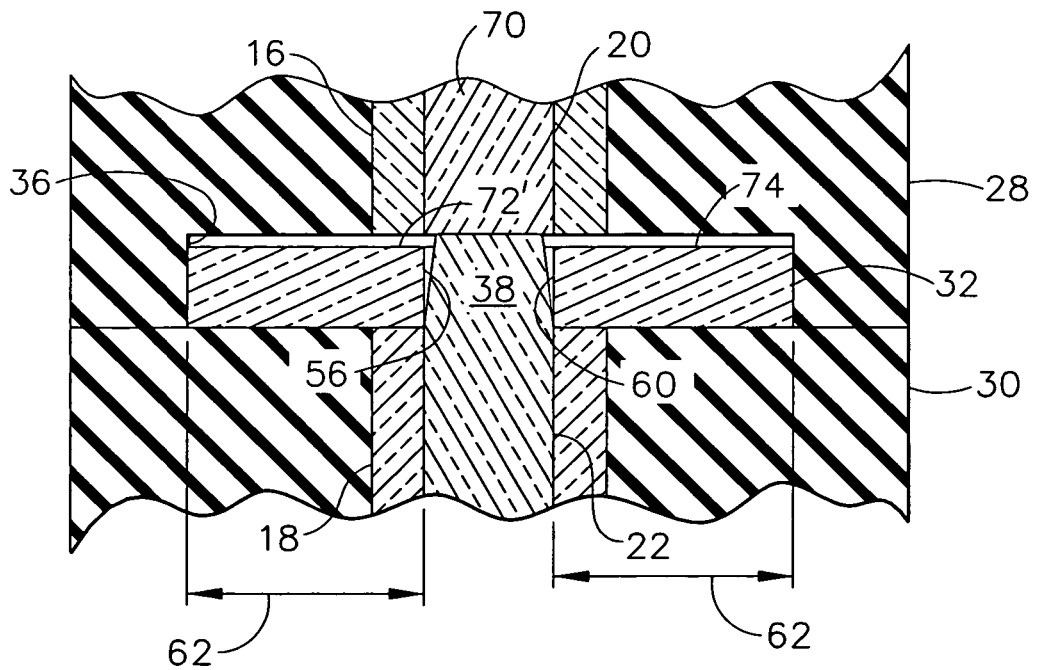
FIG. 5C is a side cross section of the connector after it has aligned itself.

An assembled connector 10 includes a path 70 through which the light can travel when being transmitted from the first cable 12 to the second cable 14. The light path 70 is generally coextensive with the core 20 of the first cable 12 because the light propagates to the connector 10 from that core. As shown in FIG. 5A, the connector 10 is configured so that a portion 72 of the optomechanical element 32 protrudes into the light path 70 passing through the connector when the first component 28 and the second component 30 of the connector are misaligned. When the connector components 28, 30 are misaligned, the cable cores 20, 22 are not aligned and light passing through the connector 10 will contact the protruding portion 72 of the optomechanical element 32. When the protrusion 72 of the optomechanical element 32 is exposed to light, the element changes a dimension and/or shape. Specifically, as shown in FIGS. 5A and 5B, when the protrusion 72 is exposed to light, the radial thickness 62 of the element 32 adjacent the protrusion decreases by an amount $\Delta$ proportional to an amount the element is exposed to the light. Because the element 32 is preloaded against the edge 36 of the recess 34 and the projection 38, a decrease in the radial thickness 62 at one portion of the element 32, such as at the protruding portion 72, results in an increase in radial thickness at a portion 74 of the element that is opposite the first portion. As shown in FIGS. 5B and 5C, as the protruding portion 72 decreases in size and the opposite portion 74 increases in size, the opposite portion pushes the projection 38 towards the portion 72' that was protruding. In this way, the optomechanical element 32 changes a dimension and/or shape when exposed to light to move the second component 30 with respect to the first component 28 to align the connector 10 and, thereby, align the cables 12, 14.

As described above, the optomechanical element 32 may be made of a material that changes a dimension and/or shape in response to light having a predetermined wavelength but does not change dimensions nor shape when exposed to light having another wavelength. Light sent through the cables 12, 14 and connector 10 can include light having a signal or communication wavelength and light having a control wavelength. When a portion 72 of the optomechanical element 32 protrudes into the light path 70, the light having the control wavelength causes the element to shrink adjacent the protrusion. In one embodiment, while the light having the control wavelength encounters the element 32, the light having the signal wavelength continues past and through the element and into the second component 30 and second cable 14 without affecting element dimension and/or shape. In this way, the connector can be aligned during use of the fiber-optic system without interfering with the data signals being transmitted.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A self-aligning connector for connecting fiber-optic cables comprising:
    a first component connected to a first cable of said cables during use of the connector;
    a second component connected to the first component and a second cable of said cables during use of the connector; and
    an optomechanical element positioned adjacent and between said first component and said second component during use of the connector, said optomechanical element including a photosensitive material that changes a dimension when exposed to light during use of the connector, a portion of the optomechanical element protruding into a light path passing through the connector when the first component and the second component are misaligned, wherein the optomechanical element changes a dimension and moves said second component with respect to said first component to align the connector when said protruding portion is exposed to the light during use of the connector.

2. A self-aligning connector as set forth in claim 1 wherein said optomechanical element includes photosensitive nanotubes embedded in an elastomeric material.

3. A self-aligning connector as set forth in claim 1 wherein said optomechanical element changes the dimension when exposed to light having a wavelength between about 650 nm and about 690 nm.

4. A self-aligning connector as set forth in claim 1 wherein the dimension of said optomechanical element remains substantially the same when the element is exposed to light having a wavelength of between about 1,500 nm and about 1,600 nm.

5. A self-aligning connector as set forth in claim 1 wherein said first component is an end of said first cable and said second component is an end of said second cable.

6. A self-aligning connector as set forth in claim 1 wherein said first component of the connector is formed separately from said first cable and said second component is formed separately from said second cable.

7. A self-aligning connector as set forth in claim 1 wherein:
    said first component includes a recess having an edge;
    said second component includes a projection; and
    said optomechanical element includes a cavity positioned around said projection and a periphery positioning adjacent said edge.

8. A self-aligning connector as set forth in claim 7 wherein said projection has a height that is greater than a depth of said recess.

9. A self-aligning connector as set forth in claim 7 wherein:

said projection has a radius that varies between a top of the projection and a bottom of the projection;
said recess is generally round;
said cavity is generally circular;
said periphery is generally circular; and
said cavity is positioned around said projection and said periphery is positioned adjacent said edge.

10. A self-aligning connector as set forth in claim 7 wherein:
the optomechanical element has a radial thickness extending between the cavity and the periphery; and
the protruding portion shrinks when exposed to light during use of the cables and connector, thereby decreasing said radial thickness adjacent the protruding portion and allowing the radial thickness opposite the protruding portion to increase and push the projection to align the connector.

11. A fiber-optic system including:
a first cable through which light is transmitted;
a connector attached to the first cable for receiving and transmitting said light and including an optomechanical element made of a photosensitive material that changes a dimension when exposed to light; and
a second cable attached to said connector opposite said first cable for receiving and transmitting said light;
wherein a portion of the optomechanical element protrudes into a path of said light when the connector is misaligned during operation of the system; and
wherein the optomechanical element changes the dimension to align the connector when said protruding portion of the element is exposed to the light during operation of the system.

12. A fiber-optic system as set forth in claim 11 wherein:
said transmitted light includes light having a signal wavelength and light having a control wavelength;
said optomechanical element has the dimension that changes when the element is exposed to said light having said control wavelength but remains substantially the same when the element is exposed to said light having a signal wavelength; and
said optomechanical element changes the dimension to align the connector when said protruding portion of the element is exposed to said light having said control wavelength.

13. A method for connecting fiber-optic cables using a self-aligning connector comprising:
providing a first component of the connector;
providing a second component of the connector for attachment to said first component;
providing an optomechanical element including a photosensitive material that changes a dimension when exposed to light;
positioning the optomechanical element adjacent said first component of the connector; and
positioning the optomechanical element adjacent said second component of the connector.

14. A method as set forth in claim 13 wherein:
said first component includes a recess having an edge;
said second component includes a projection;
said optomechanical element includes a cavity;
the step of positioning the optomechanical element adjacent the first component includes positioning the optomechanical element in said recess; and
the step of positioning the optomechanical element adjacent the second end includes positioning the cavity around said projection.

15. A method as set forth in claim 13 further comprising exposing the optomechanical element to light to change the dimension of the element after the step of positioning the optomechanical element adjacent the second component of the connector and before the step of positioning the optomechanical element adjacent the first component of the connector.

16. A method as set forth in claim 13 wherein said first component is an end of a first cable of said cables and said second component is an end of a second cable of said cables and the method further comprises attaching said first cable to said second cable using a fastener.

17. A method as set forth in claim 13 further comprising:
connecting said first component of the connector to a first cable of said cables;
connecting said second component of the connector to a second cable of said cables; and
attaching said first cable to said second cable using a fastener.

18. A method for aligning cables in a fiber-optic system comprising:
providing a first cable of said cables;
providing a second cable of said cables for attachment to said first cable;
providing a connector including a first component connected to the first cable, an optomechanical element including a photosensitive material connected to said first component, and a second component connected to said first component, said optomechanical element, and said second cable; and
transmitting light through said first cable to the connector along a light path;
wherein a portion of the optomechanical element protrudes into the path of light when the connector is misaligned; and
wherein the element changes a dimension and moves said second component with respect to said first component to align the connector when said protruding portion of the optomechanical element is exposed to the light.

19. A method as set forth in claim 18 wherein:
the first component of the connector includes a recess having an outer edge;
the second component of the connector includes a projection;
the optomechanical element has a cavity positioned around said projection of the second component and has a periphery positioned adjacent said recess edge;
the element has a radial thickness extending between the cavity and the periphery; and
the protruding portion shrinks when exposed to the light thereby decreasing said radial thickness adjacent the protruding portion and allowing the radial thickness opposite the protruding portion to increase and push the projection to align the connector.

20. A method as set forth in claim 18 wherein:
the step of transmitting light includes transmitting light having a signal wavelength and light having a control wavelength; and
said optomechanical element has a dimension that changes when the element is exposed to said light having the control wavelength light but remains substantially the same when the element is exposed to said light having the signal wavelength.

* * * * *